United States Patent [19]
Ostertag et al.

[11] Patent Number: 5,632,834
[45] Date of Patent: May 27, 1997

[54] PROCESS FOR PRODUCING SANDWICH STRUCTURES FROM FIBER-REINFORCED CERAMICS

[75] Inventors: Rolf Ostertag, Oberuhldingen; Tilman Haug, Markdorf; Richard Renz, Immenstaad; Wolfgang Zankl, Friedrichshafen, all of Germany

[73] Assignee: Dornier GmbH, Germany

[21] Appl. No.: 386,657

[22] Filed: Feb. 10, 1995

Related U.S. Application Data

[63] Continuation of Ser. No. 766,188, Sep. 27, 1991, abandoned.

[30] Foreign Application Priority Data

Sep. 27, 1990 [DE] Germany .......................... 40 30 529.5

[51] Int. Cl.⁶ .......................... B32B 31/12; B32B 31/20
[52] U.S. Cl. .......................... 156/89; 156/173; 156/175; 156/182; 156/189; 156/191; 156/194; 156/192; 264/630
[58] Field of Search .......................... 156/89, 155, 173, 156/174, 175, 182, 189, 191, 192, 193, 194, 297; 264/60

[56] References Cited

U.S. PATENT DOCUMENTS

| | | | |
|---|---|---|---|
| 4,254,171 | 3/1981 | Beggs et al. | 156/182 X |
| 4,460,638 | 7/1984 | Haluska | 156/89 X |
| 4,460,640 | 7/1984 | Chi et al. | 156/89 X |
| 4,461,796 | 7/1984 | Fukahori et al. | |
| 4,568,594 | 2/1986 | Hordonneau et al. | 264/60 X |
| 4,664,731 | 5/1987 | Layden et al. | 156/89 |
| 4,692,367 | 9/1987 | Richter | 156/89 X |
| 4,822,660 | 4/1989 | Lipp | |
| 5,067,999 | 11/1991 | Streckert et al. | 156/89 |
| 5,078,818 | 1/1992 | Han et al. | 156/89 |
| 5,308,421 | 5/1994 | Gonczy et al. | 156/89 |

FOREIGN PATENT DOCUMENTS

| | | |
|---|---|---|
| 3203659A1 | 8/1983 | Germany . |
| 3739250A1 | 5/1988 | Germany . |
| 2197618 | 11/1986 | United Kingdom . |
| WO88/04607 | 6/1988 | WIPO . |

*Primary Examiner*—David A. Simmons
*Assistant Examiner*—M. Curtis Mayes
*Attorney, Agent, or Firm*—Evenson, McKeown, Edwards & Lenahan P.L.L.C.

[57] ABSTRACT

A process for the production of sandwich structures made of fiber-reinforced ceramics, the base substance of the ceramic matrix consisting of a Si-organic polymer and a ceramic or metallic powder. A cross-linking of the Si-organic polymer takes place under increased pressure and at an increased temperature. After the joining of the facings and the honeycomb core, the sandwich structure is pyrolysed to form a ceramic material.

5 Claims, 2 Drawing Sheets

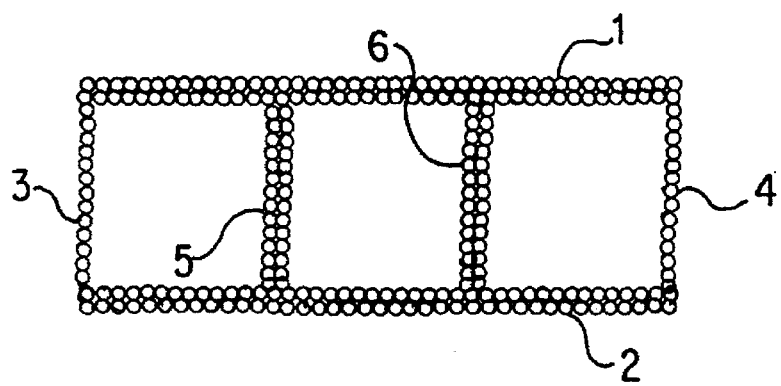
FIG.1
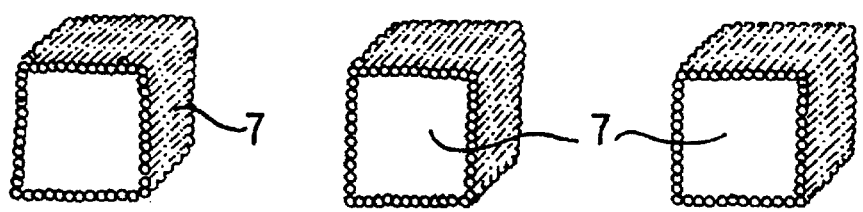
} FIG.2a
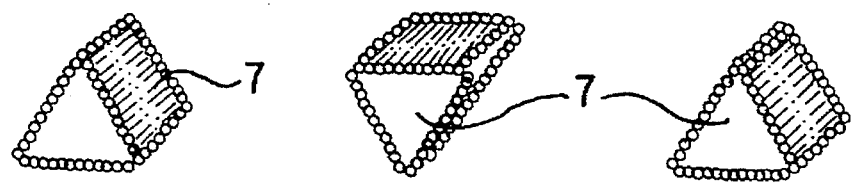
} FIG.2b
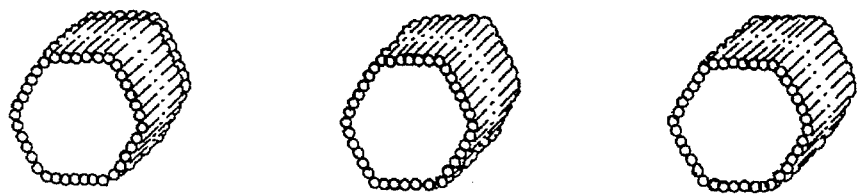
} FIG.2c

PROCESS FOR PRODUCING SANDWICH STRUCTURES FROM FIBER-REINFORCED CERAMICS

This is a continuation of application Ser. No. 07/766,188, filed Sep. 27, 1991, now abandoned.

BACKGROUND AND SUMMARY OF THE INVENTION

The invention relates to a process for producing sandwich structures from fiber-reinforced ceramics.

Sandwich structures which are composed of a honeycomb core and facings are preferably used as light structural members of high rigidity. Up to now, the base materials for their production usually have comprised metals and plastics, which do not have sufficient resistance to temperatures for special applications, for example, for use in space.

It is an object of the invention to provide a process for producing a structural member which has good physical properties and is highly resistant to increased temperatures (T>700° C.), corrosion and oxidation.

According to the invention, this object is achieved by means of a process including the steps of: impregnating inorganic fibers or a woven material with a slip of Si-organic polymers and a ceramic or metallic powder, molding of facings and honeycomb core by means of winding and laminating techniques, pressure and temperature treatment of facings and honeycomb core for cross-linking (curing) of the organic polymer, joining of the complete structure by aforementioned cross-linking and/or by additional binding agents after the cross-linking, and no-pressure pyrolysis for the conversion into a ceramic material.

For producing the honeycomb core and the facing, inorganic fibers on a base of $SiO_2$, $Al_2O_3$, C, SiC (such as NEXTEL-Fibers, TYRANNO-Fibers, NICALON-Fibers, C-Fibers) are impregnated with a slip of Si-organic polymers (such as silanes, silazanes and/or siloxanes) which are mixed with a ceramic or metallic powder (such as SiC, $Al_2O_3$, mullite, $Si_3N_4$, glass or $SiO_2$, metals). The part of the ceramic or metallic powder preferably amounts to 10–70% by volume, and the particle size of the powder is in the range of under 20 μm. The fiber part amounts to approximately 20 to 80% of the total volume of the structural member.

PRODUCTION OF THE FACINGS

The inorganic fibers are impregnated with the slip at room temperature in a special impregnating bath and are deposited on a winding core in such a manner that a prepreg is created. The prepreg may be designed to be either unidirectional, or the fiber orientation may be arranged at arbitrary angles. By means of sandwiching, the prepregs are laminated to shaped bodies of a defined thickness and fiber orientation. The prepregs may be created not only by the winding of fibers but also by the impregnation of a woven material made of the above-mentioned fibers.

In the next production step, the pressing of the laminated prepregs takes place under autoclave conditions or in a heatable press at an increased temperature and pressure, whereby the Si-organic polymer is cured. The preferred values for the pressure and the temperature in this case are between 150°–300° and between 10–50 bar.

Production of the Honeycomb Cores

The inorganic fibers are impregnated with the slip at room temperature. Subsequently, a plurality of winding cores of a corresponding geometry are wound with impregnated fibers. Thereafter, the wound cores are sandwiched in a suitable pressing tool and under autoclave conditions or in a heatable press and pressed in such a manner that a honeycomb core is created. The Si-organic polymer cures under the increased pressures and temperatures. The curing may optionally take place either completely or only partially but, in any case, permits the shaping of the wound cores. Cross-linking preferably takes place between 150°–300° C. at pressures between 10–50 bar. The honeycomb core can be machined mechanically or deformed spherically in a classical manner.

PRODUCTION OF THE SANDWICH STRUCTURES

1. Prefabricated Facings and Honeycomb Cores

As required, the prefabricated honeycomb core is arranged between the facings and is deposited in a gluing or curing device (autoclave or heating press). The curing conditions are selected such that the partially cross-linked (cured) preceramic matrix become plastic again in the facings and in the honeycomb core, and can connect the parts without any additional binding agent.

As an alternative, completely hardened facings and honeycomb cores may also be joined by the use of a suitable binding agent (such as Si-polymers with or without ceramic powder, temperature-resistant inorganic bonding agents). In this case, the characteristics of the composite body are also determined by the thermo-mechanical characteristics of the bonding agent.

2. Partly Integral Solution

A facing is produced according to the above description. The honeycomb cores and the second facing are manufactured as described above but are not cured; the wound cores remain in the honeycomb cells.

The uncured facing and the honeycomb core are jointly pressed in a tool into a composite and are slightly cured. Subsequently, the wound cores are removed from the honeycomb cells. After mechanical machining of the open honeycomb side where required, the prefabricated facing is applied as described in Point 1.

3. Completely Integral Solution

Both facings and the honeycomb core are joined in an uncured condition, are cured at an increased pressure and temperature, and the wound cores are removed as disposable cores through corresponding recesses by mechanical, chemical or physical methods.

The joining to form the complete structure is followed in each case by a no-pressure pyrolysis treatment in an oxygen-free atmosphere by means of which the cross-linked preceramic matrix is changed into a ceramic material. In this case, the temperatures are in the range of from 1,000° C.–1,500° C.

The structural component obtained by means of the process may be of a flat or a curved shape and may also be produced in a large size.

The principal advantage of the invention is that it permits the production of ceramic sandwich structures by application of conventional methods of processing synthetic materials. In addition, the ceramic sandwich member has both good stability and significantly greater resistance to corrosion, oxidation and high temperatures than metals or plastic members of the same type. In comparison to monolithic ceramics, it has an increased fracture toughness.

Herein, tube-shaped structural components with a round or square cross-section as well as slabs, have been made from fiber-reinforced ceramics which have a good stability (approximately 150 MPa) with a bidirectional fiber orientation. In addition, it was demonstrated that the material is stable with respect to an oxidation at 1,100° C. and a reduction below $H_2$ at 1,000° C. The high-temperature resistance up to 1,100° C. has also been demonstrated.

Other objects, advantages and novel features of the present invention will become apparent from the following detailed description of the invention when considered in conjunction with the accompanying drawings.

BRIEF DESCRIPTION OF THE DRAWINGS

FIG. 1 shows a cross sectional view of a sandwich structure produced by the process according to the invention;

FIGS. 2a, 2b and 2c are cross sectional views of alternative structures for tubes prepared by winding of filaments on core elements according to the invention;

DETAILED DESCRIPTION OF THE DRAWINGS

Referring to FIG. 1, there is shown an example of ceramic fiber reinforced ceramic composite (CMC) sandwich produced by the process according to the invention. The fiber used in this instance was NICALON NL607 (SiC), with a fiber content of 50–55 percent by volume. The matrix is composed of 40 percent SiOC and 54 percent SiC powder, by volume. It has a porosity of 10–15 percent, density of 2.2–2.3 g/cm$^3$ and a thermal expansion coefficient of 3.5× 10$^{-6}$K$^{-1}$.

The top and bottom of the sandwich of FIG. 1 are comprised of four layers each with alternating orientations of 0° and 90°. The planes 1 and 2 are comprised of eight layers arranged in alternating orientations of ±45°, having a total thickness of 2 mm. The outer planes 3, 4 have four layers oriented alternately at ±45°, with a thickness of 1 mm, while the inner planes 5, 6 have eight layers laid out at ±45° with a thickness of two millimeters.

For the production of the ceramic reinforced ceramic composite shown in FIG. 1, an infiltration pre-ceramic polymer slurry and a filler pre-ceramic polymer slurry were produced. The infiltration slurry was comprised of 60% by volume SiC powder with a particle size smaller than 1 μm and 40% by volume polysiloxane, while the filler slurry was comprised at 80% by volume SiC powder with the same quality as above, and 20% polysiloxane.

To manufacture a CMC sandwich (ceramic fiber/SiC-SiOC matrix) several tubes 7 were prepared by winding a filament on steel cores. The cores may have a substantially rectangular, triangular or hexagonal cross-section as shown in FIGS. 2a, 2b and 2c respectively. A layout of plus and minus 45° in the orientation of the fibers was preferred. A typical cross-section may have a measurement of, for example, 10 mm×10 mm or 80 mm or 80 mm.

Figure 3:
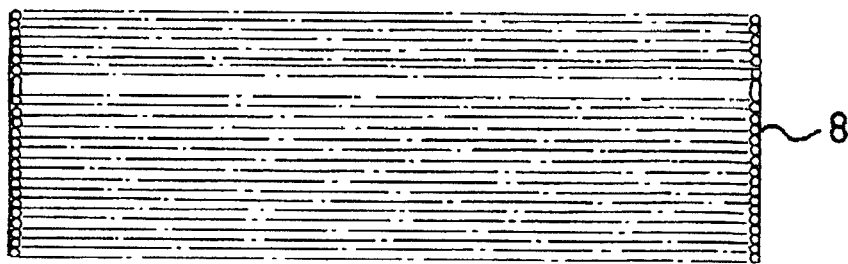
FIG. 3 shows a unidirectional prepreg prepared according to the invention.
Figure 4:
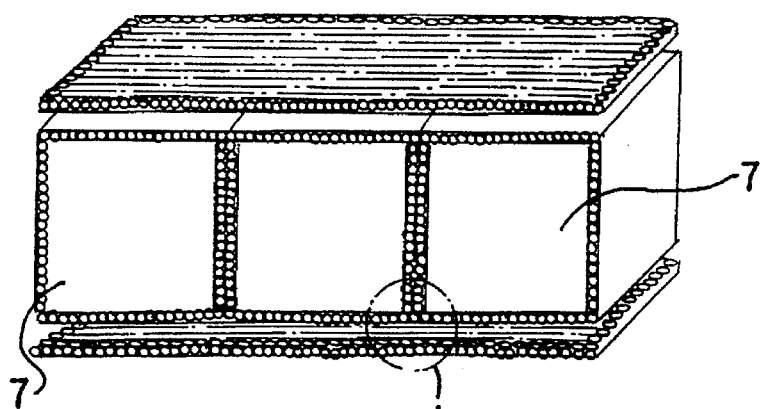
FIG. 4 shows a cross sectional view of the cores and the plates prior to bonding together for the sandwich structure of FIG. 1.
Figure 4A:
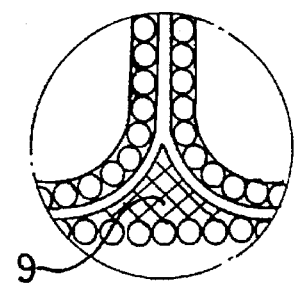
FIG. 4a is an enlarged cross section of a portion of FIG. 4.
Figure 5:
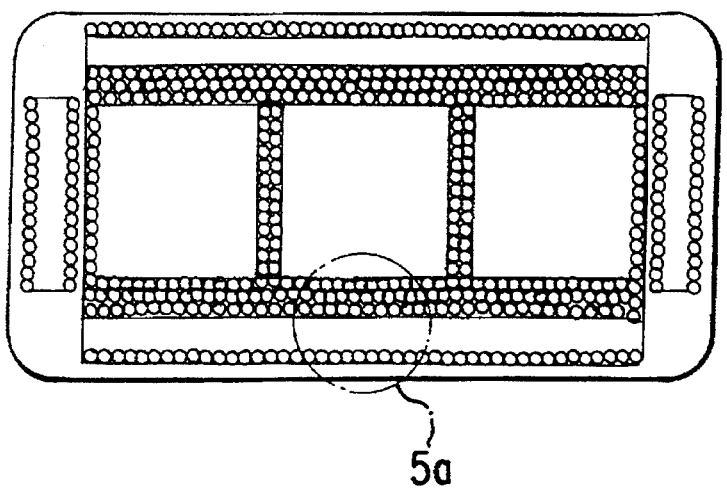
FIG. 5 shows the sandwich structure of FIG. 1 covered with additional layers during heating to achieve bonding.
Figure 5A:
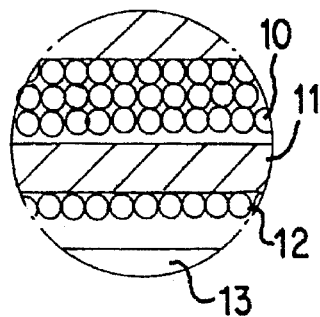
FIG. 5a, is an enlarged view of a portion of the structure of FIG. 5 indicated by a circle therein.

With the same filament winding process unidirectional prepregs 8 were produced as shown in FIG. 3. For the bottom and top plate with the dimensions of about 400 mm×200 mm these prepregs were laminated by four unidirectional prepregs with alternating angle orientations of 0°, 90°, 0°, 90° each. The steel cores with the wound prepregs were brushed with the preceramic polymer slurry to achieve good bonding during the autoclave process step. These prepared steel cores were then pressed together as shown in FIG. 4, and the triangular shaped gaps thus formed were filled by a powder rich preceramic polymer slurry 9 as best shown in FIG. 4a. The body thus prepared was placed between the laminated top and bottom plates as shown in FIG. 4 and the sandwich was then covered with glass fiber fabric 10, sheet metal 11 a glass fiber fabric 12 and a vacuum foil 13. The sandwich was then evacuated and heated in an autoclave with 5K per/min to 250° C. under 15 bar pressure. This temperature was held for 3 hours. During this process the polymer first became fluid which allows a very good impregnation and bonding. At 250° C. for three hours the polymer was cross-linked forming the preceramic sandwich. After the autoclave process step, the glass fiber fabric sheet metal, glass fiber fabric and vacuum foil layers 10, 11, 12 and 13 were removed. After further cooling the cores were removed also.

The sandwich as shown in FIG. 1, is extremely tough and can be machined with diamond tools. To obtain the ceramic matrix the sandwich was pyrolysed in an Ar-Atmosphere without pressure and without forming tools at 1100° C. for one hour. The structure keeps its shape very accurately. After the pyrolysis a porosity of 20 to 25% was achieved. To improve the mechanical strength, a reimpregnation step with the pure polymer can be performed to reduce the porosity to 10 to 15%. This reimpregnation may be carried out in a vacuum at room temperature with pure polysiloxane. Pyrolysis must be done as described above. With three impregnation steps the porosity can be reduced to 8 to 12%.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for the production of a sandwich structure with facings and a honeycomb core made of fiber-reinforced ceramics comprising the steps of:

impregnating inorganic fibers or wovens with a slip comprising at least a Si-organic polymer and a ceramic or metallic powder;

molding facings;

molding a honeycomb core by placing or winding the impregnated woven or fibers on respective mold cores;

partially cross-linking said at least a Si-organic polymer to form a preceramic matrix, by pressure and temperature treatment of said facings and said honeycomb core;

removing said mold cores from said honeycomb core;

joining said facings and said honeycomb core to form said sandwich structure by complete cross-linking of said Si-organic polymer of said preceramic matrix by means of pressure and temperature treatment;

no-pressure pyrolysis for conversion of said preceramic matrix into a ceramic material.

2. A process according to claim 1, wherein molding of the honeycomb core to an arbitrary cell geometry takes place by sandwiching the mold cores by means of a pressing tool.

3. A process according to claim 1, wherein the molding of a facing takes place by means of the process steps of:

placing or winding the impregnated wovens or fibers on a mold core so that a prepreg is produced; and laminating the prepregs into shaped bodies of a defined thickness and fiber orientation.

4. A process for the production of a sandwich structure with facings and a honeycomb core made of fiber-reinforced ceramics comprising the steps of:

impregnating inorganic fibers or wovens with a slip comprising at least a Si-organic polymer and a ceramic or metallic powder;

molding facings and a honeycomb core by means of winding and laminating techniques;

applying a first facing to said honeycomb core;

partially cross-linking (curing) said at least a Si-organic polymer to form a preceramic matrix, by pressure and temperature treatment of said facing and said honeycomb core;

applying a second facing to said honeycomb core to form said sandwich structure;

complete cross-linking of said Si-organic polymer of said preceramic matrix by means of pressure and temperature treatment; and no-pressure pyrolysis for conversion of said preceramic matrix into a ceramic material.

5. A process for the production of a sandwich structure with facings and a honeycomb core made of fiber-reinforced ceramics comprising the steps of:

impregnating inorganic fibers or wovens with a slip comprising at least a Si-organic polymer and a ceramic or metallic powder;

molding facings and a honeycomb core by means of winding and laminating techniques;

partially cross-linking (curing) said at least a Si-organic polymer to form a preceramic matrix, by pressure and temperature treatment of said facings and said honeycomb core;

applying said facings to honeycomb core to form said sandwich structure;

complete cross-linking of said Si-organic polymer of said preceramic matrix by means of pressure and temperature treatment; and no-pressure pyrolysis for conversion of said preceramic matrix into a ceramic material.

* * * * *